(12) United States Patent
Phipps (10) Patent No.: US 6,955,004 B2
(45) Date of Patent: Oct. 18, 2005

(54) MULTIPLE ACTION BUZZ BLADE FISHING LURE

(76) Inventor: Ty W. Phipps, 4812 Wilkshire Dr., Knoxville, TN (US) 37921

(*) Notice: Subject to any disclaimer, the term of this patent is extended or adjusted under 35 U.S.C. 154(b) by 0 days.

(21) Appl. No.: 10/758,207

(22) Filed: Jan. 15, 2004

(65) Prior Publication Data
US 2005/0155273 A1 Jul. 21, 2005

(51) Int. Cl.⁷ .................... A01K 85/01; A01K 85/10
(52) U.S. Cl. .................... 43/42.31; 43/42.13
(58) Field of Search .............. 43/42.31, 42.13, 43/42.11, 42.12, 42.14, 42.5; D22/129

(56) References Cited

U.S. PATENT DOCUMENTS

| | | | | |
|---|---|---|---|---|
| 1,591,704 A | * | 7/1926 | Grube | 43/42.13 |
| 1,682,710 A | * | 8/1928 | Pflueger | 43/42.13 |
| 1,847,397 A | * | 3/1932 | Hofschneider | 43/42.5 |
| 1,914,211 A | * | 6/1933 | Novitzky | 43/42.5 |
| 2,214,266 A | * | 9/1940 | Haury | D22/129 |
| 2,251,593 A | * | 8/1941 | Mangle | 43/42.31 |
| 2,315,295 A | * | 3/1943 | Stogermayr | D22/129 |
| 2,562,743 A | * | 7/1951 | Schindler et al. | 43/42.12 |
| 2,630,649 A | * | 3/1953 | Arbogast | 43/42.12 |
| 2,797,520 A | * | 7/1957 | Nycz et al. | 43/42.12 |
| 2,878,612 A | | 3/1959 | Netherton et al. | |
| 3,055,138 A | * | 9/1962 | Mutti | 43/42.13 |
| 3,808,726 A | * | 5/1974 | Flanagan, Jr. | 43/42.13 |
| 3,828,463 A | * | 8/1974 | Perrin | 43/42.11 |
| 4,003,154 A | * | 1/1977 | Carver | 43/42.13 |
| 4,133,135 A | * | 1/1979 | Miles | 43/42.13 |
| 4,201,008 A | * | 5/1980 | Sparkman | 43/42.13 |
| 4,209,932 A | * | 7/1980 | Pate | 43/42.13 |
| 4,619,068 A | * | 10/1986 | Wotawa | 43/42.31 |
| 4,638,586 A | * | 1/1987 | Hall | 43/42.13 |
| 4,718,191 A | * | 1/1988 | Gentry | 43/42.13 |
| 4,745,700 A | * | 5/1988 | Davis | 43/42.13 |
| 4,765,085 A | * | 8/1988 | Wotawa et al. | 43/42.13 |
| 4,793,089 A | * | 12/1988 | Long et al. | 43/42.13 |
| 4,823,501 A | * | 4/1989 | Standish, Jr. | 43/42.31 |
| D301,274 S | * | 5/1989 | Huddleston | D22/129 |
| 4,884,358 A | * | 12/1989 | Grove et al. | 43/42.13 |

(Continued)

FOREIGN PATENT DOCUMENTS

JP         2002-191258 B1  *  7/2002

(Continued)

OTHER PUBLICATIONS

Bass Pro Shops, Master Catalog, Spring 2003, p. 175, Springfield, MO.

Primary Examiner—Darren W. Ark
(74) Attorney, Agent, or Firm—Pitts & Brittian, P.C.

(57) ABSTRACT

A fishing lure including a rotatable blade having pivotable clappers thereon is provided with primary and secondary wire legs aligned parallel and connected at a junction for attaching a fishing line thereto. A bait segment is affixed on the primary wire leg and is disposed adjacent and behind the secondary wire leg to negate contact during trolling. The bait segment includes an elongated head portion having a narrow front expanding to an enlarged mid-portion having an oval cross-section tapering a distal end from which a fish hook extends with a barbed end curved toward the head portion. A blade is disposed to rotate about the secondary wire leg during trolling and includes sound generators pivotably attached on opposed blade surfaces. Trolling near the water surface positions the rotating blade to intermittently expose each blade surface and pivoting sound generator to the water surface creating turbulence and sound for attracting fish.

17 Claims, 4 Drawing Sheets

U.S. PATENT DOCUMENTS

| | | | |
|---|---|---|---|
| 4,891,901 A * | 1/1990 | Baker, Jr. | 43/42.13 |
| 4,901,470 A | 2/1990 | Gentry | |
| 4,920,685 A * | 5/1990 | Landuydt | D22/129 |
| 4,930,247 A * | 6/1990 | Dubois | 43/42.31 |
| 4,962,610 A * | 10/1990 | Bleam et al. | 43/42.5 |
| 5,001,856 A * | 3/1991 | Gentry | 43/42.31 |
| 5,024,019 A * | 6/1991 | Rust et al. | 43/42.31 |
| 5,050,334 A * | 9/1991 | Standish, Jr. | 43/42.13 |
| 5,146,706 A * | 9/1992 | Hilliard | 43/42.13 |
| 5,201,784 A * | 4/1993 | McWilliams | 43/42.31 |
| 5,321,905 A * | 6/1994 | Higgins | 43/42.14 |
| 5,381,621 A * | 1/1995 | Fuller | 43/42.13 |
| 5,400,542 A * | 3/1995 | Johnson | 43/42.13 |
| 5,412,899 A * | 5/1995 | Reboul | 43/42.13 |
| 5,426,886 A | 6/1995 | Stanley | |
| 5,499,470 A * | 3/1996 | Reed | 43/42.13 |
| 5,564,218 A * | 10/1996 | Kato | 43/42.13 |
| 5,926,995 A | 7/1999 | Dubois | |
| 5,987,805 A * | 11/1999 | Laney | 43/42.13 |
| 6,018,901 A * | 2/2000 | DuBois | 43/42.13 |
| 6,155,000 A * | 12/2000 | Ravencroft | 43/42.31 |
| D447,211 S * | 8/2001 | Kysilka | D22/129 |
| 6,601,336 B1 * | 8/2003 | Link | 43/42.13 |

FOREIGN PATENT DOCUMENTS

JP     2003-61519 B1 *   3/2003

* cited by examiner

MULTIPLE ACTION BUZZ BLADE FISHING LURE

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

This invention pertains to fishing lures. More particularly, this invention pertains to fishing lures having multiple movements during trolling.

2. Description of the Related Art

Artificial fishing lures are widely utilized for catching fish in small and large bodies of water. It is recognized that an artificial fishing lure can be made to attract fish when the lure provides movement through the water, and/or noise during trolling in order to duplicate movements of live bait. Fishing lures having spinners that are reciprocated or rotated during trolling have come to be known in the trade as a "spinner bait" or "buzz bait."

A typical spinner type of fishing lure includes elongated spoons or spinners that are connected a distance ahead of a trailing imitation fish head and hook. The spoons or spinners will flutter or wobble as the lure is pulled through the water. To minimize contact with the hook, the spoons or spinners must be extended an adequate spaced distance angled away from the head and hook. Due to the spoons or spinners being spaced laterally and angled away from the head and hook, the hook and/or spoons or spinners may be readily fouled on vegetation gathering therebetween during trolling near a shoreline. Lures having elongated spoons or spinners are preferably operated underwater due to potential separation of the spoons or spinners if persistently contacting with the surface of the water. Further, to induce submerging of the lure under the water surface, fishing lures having elongated spoons or spinners typically include an axis of rotation for the spoons or spinners that is inclined away from the head and hook portion of the lure order to urge the lure to remain submerged during trolling.

Other typical spinner lures include blades and spoons that are rotatable on one portion of a frame of a lure that is spaced apart from a second portion of the lure having an imitation fish head and hook. The blades and spoons are typically paired to rotate and/or reciprocate at different speeds in order to strike each other during rotation underwater, with resulting production of clicking or chattering sounds that are intended to attract fish. An additional type of spinner lure includes a spinner portion that spins adjacent to a fish head element and hook. The spinner lure can include a plurality of spinners and/or spoons that are stacked proximal of each other for spinning in synchronized movement during passage of the spinner lure underwater. Each prior spinner lure typically includes the axis of the spinner portion being angled in relation to the axis of the portion having a fish head element and hook, in order to induce the spinner lure to travel deep within the water or to travel upwards toward the water surface during trolling and recovery of the lure for recasting. If the spinner lure is allowed to free fall in the water with the hook oriented downwards from the water surface, the plurality of spinners and/or spoons can become entangled with the fish head element and hook, or can become tangled with a plurality of strands that envelop the hook.

A fishing lure is needed that is configured to maintain a bait head and hook apart from an adjacently oriented blade that is readily rotated during trolling to produce sound regardless of whether trolling occurs on the water surface or underneath the water surface. Further, a fishing lure is needed including a bait head, hook, and an adjacent blade portion having clappers pivotably attached thereon, with the clappers producing sound and water turbulence during rotation of the blade induced by water flowing across the opposed winged portions of the blade during trolling. In addition, a fishing lure is needed having a bait head portion that includes a tapered shape that induces lift for the bait head to move through the water with an adjacently positioned blade rotating at the water surface while the bait head portion and hook remain below the water surface in a strike zone for a fish to attack when attracted to the sound and water turbulence created by the blade rotating at or below the water surface.

BRIEF SUMMARY OF THE INVENTION

According to one embodiment of the present invention, a fishing lure is provided which generates movement and sounds during trolling. The fishing lure includes a primary wire leg having a forward segment configured for attachment to a fishing line, and having a bait segment disposed distal of the forward segment, with the bait segment having a body extending to a trailing end from which a fish hook extends. The fishing lure also includes a secondary wire leg having a leading segment extended from the forward segment of the primary wire leg, with the secondary wire leg having a length disposed a selected distance apart from the primary wire leg.

A blade is rotatably mounted on the secondary wire leg to freely rotate during trolling during fishing. The blade includes opposed surfaces having first and second end segments angled in opposed directions to facilitate rotation of the blade during trolling. A clapper is pivotably attached on at least one of the opposed surfaces of the blade. The clapper is freely pivoted during rotation of the blade during trolling proximal of a water surface, with each rotation of the blade positioning the opposed blade surfaces for contacting the water surface, and thereby pivoting the clapper against one of the blade surfaces and further contacting of the clapper with the water surface resulting in creation of water turbulence and sound for attracting fish to strike the fish hook extended from the bait segment.

The bait segment is spaced apart and is disposed distal of the blade first and second end segments to negate contact during rotation of the blade during trolling. The bait segment includes an elongated head portion having a narrow leading end expanding to an enlarged mid-portion having an oval cross-section. The enlarged mid-portion of the bait segment creates lift upwards through the water when the fishing line is pulled during rapid trolling or to set the hook in a fish. The enlarged mid-portion tapers to a trailing end from which the fish hook shaft extends. A fish hook barbed end is curved forwardly toward the bait segment and is positioned behind the rotatable blade, thereby negating contact with the pivotable clapper and the blade end segment during blade rotation.

Another embodiment for a fishing lure providing movement and sound during trolling includes a primary wire leg having a forward segment configured for attachment to a fishing line, and having a bait segment disposed distal of the forward segment. The bait segment includes a body extending to a trailing end from which a fish hook extends. A secondary wire leg includes a leading segment extended laterally from the forward segment of the primary wire leg, with the secondary wire leg having a length disposed a selected distance apart from the primary wire leg. A blade is rotatably mounted on the secondary wire leg, and the blade includes opposed surfaces having first and second end segments angled in opposed directions to facilitate rotation of the blade during trolling. At least two clappers are pivotably attached in diametrically opposed positions on the opposed surfaces of the blade. Each clapper pivots independently during rotation of the blade. During trolling proximal of a water surface, each rotation of the blade positions the opposed blade surfaces for contacting the water surface with pivoting of each clapper against respective blade surfaces and further contacting of the clappers with the water surface resulting in creation of water turbulence and sound for attracting fish to strike the fish hook extended from the bait segment.

During rapid trolling proximal of the water surface, the opposed surfaces of the blade are rapidly exposed above the water surface. The blade rotational action will swing each respective clapper pivotable above the water surface resulting in water turbulence and sound created for attraction of fish to the bait segment. Further, the blade rotational action churns the water surface while the rotational action swings each clapper periodically forces each flanged side under the water surface during trolling, with generation of air bubbles and turbulence under water. Each swinging clapper generates air bubbles and other sounds during trolling near the water surface, thereby attracting a fish to strike on the fish hook barbed end. The lure moves through the water with rotational motions and sounds that mimic a small fish or an insect floundering near the water surface with resulting attraction of larger fish and increased frequency of fish strikes.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
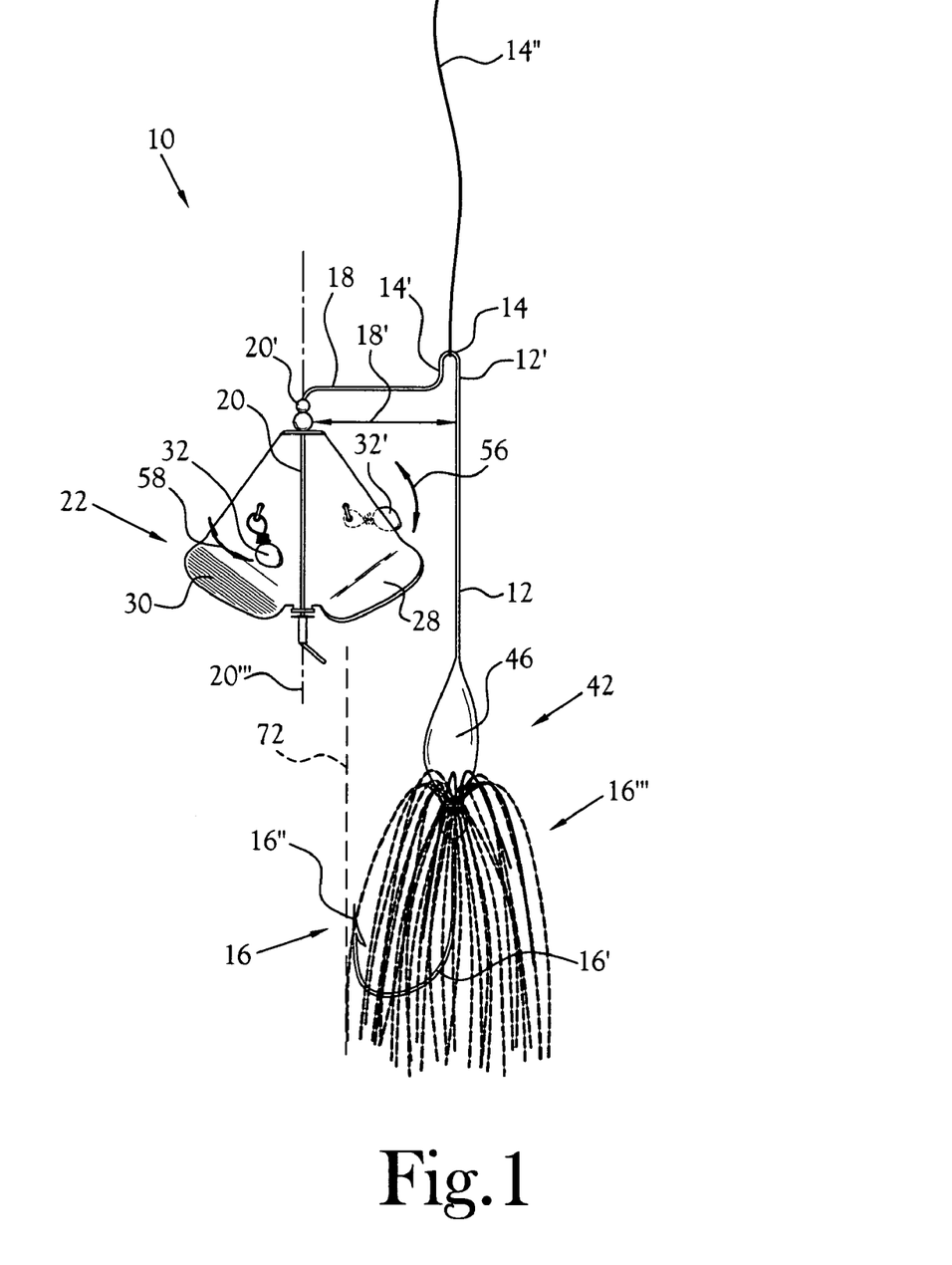
FIG. 1 is a side view of a fishing lure of the present invention, illustrating a rotatable blade positioned adjacent and spaced apart from a bait segment.
Figure 2A:
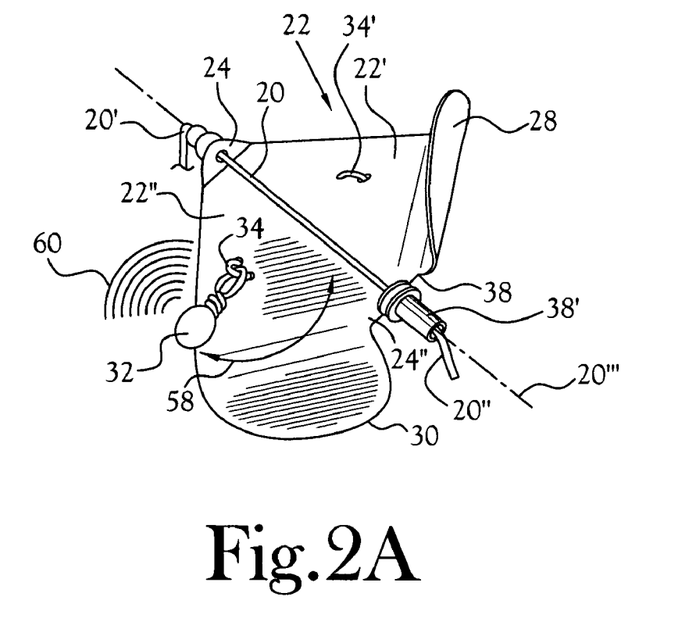
FIG. 2A is a rear perspective view of the rotatable blade of FIG. 1.
Figure 2B:
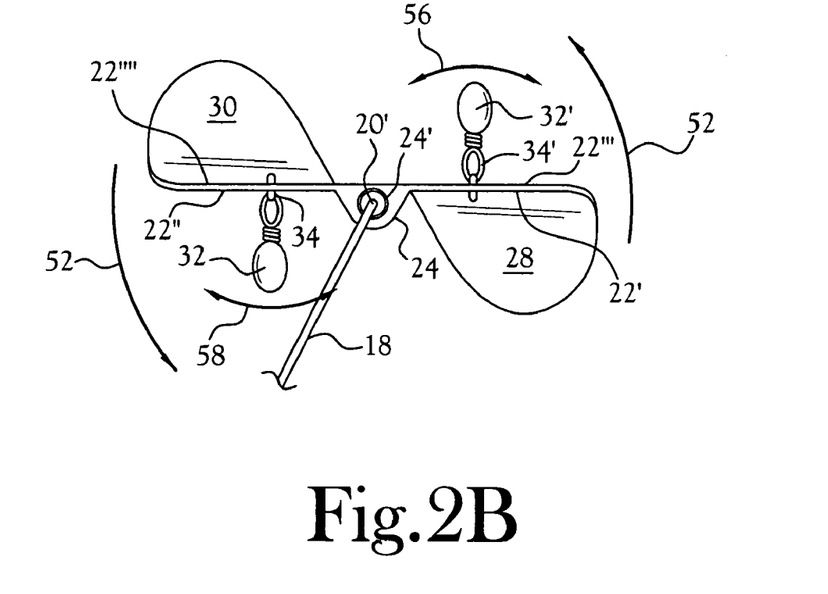
FIG. 2B is a front view of the rotatable blade of FIG. 1, illustrating the rotation movement of the blade and the pivoting movement of each clapper on diametrically opposed surfaces of the blade.
Figure 3:
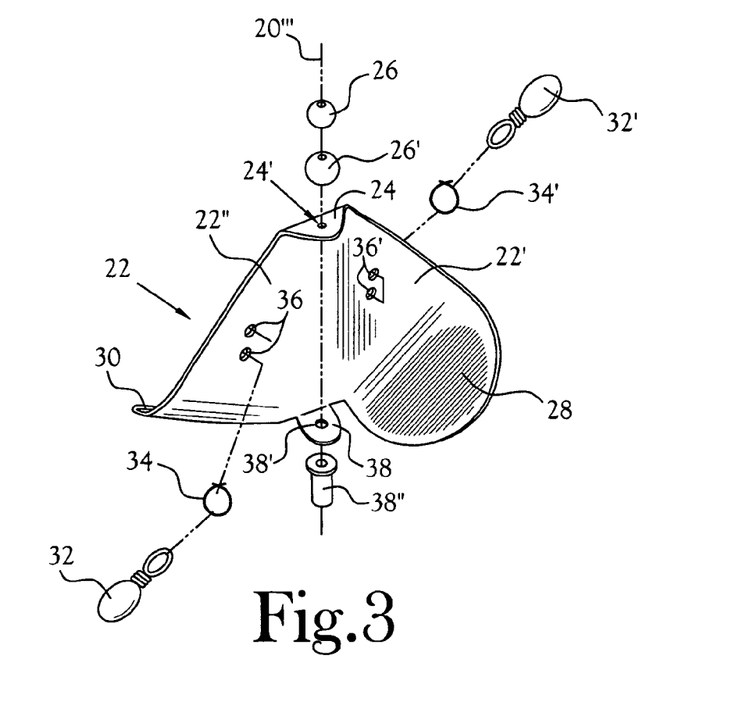
FIG. 3 is a side exploded view of FIG. 2A, illustrating the clappers, attachment loops on diametrically opposed sides of the blade, and front and rear spacers for positioning the blade on the secondary wire leg of the lure.
Figure 5:
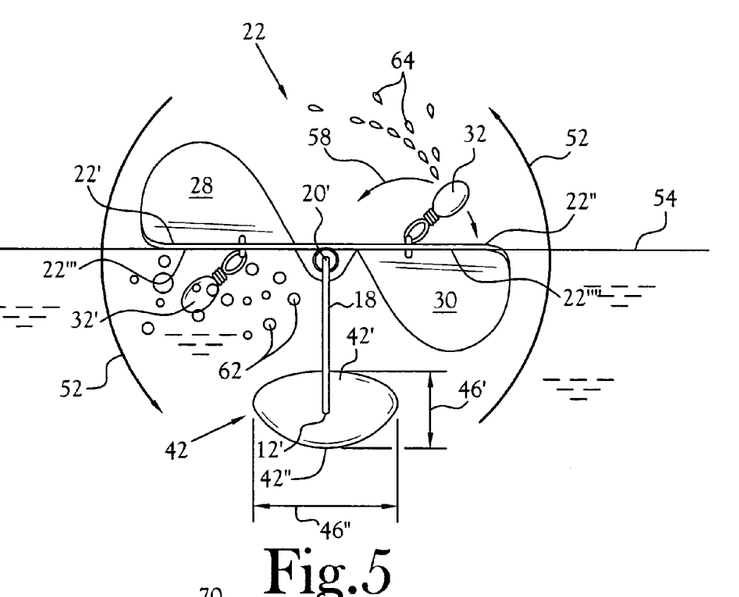
FIG. 5 is a front view of FIG. 1, illustrating the lure during trolling proximal of the water surface, with one angled segment of the blade rotated out of the water and one clapper extended above the water surface.
Figure 6:
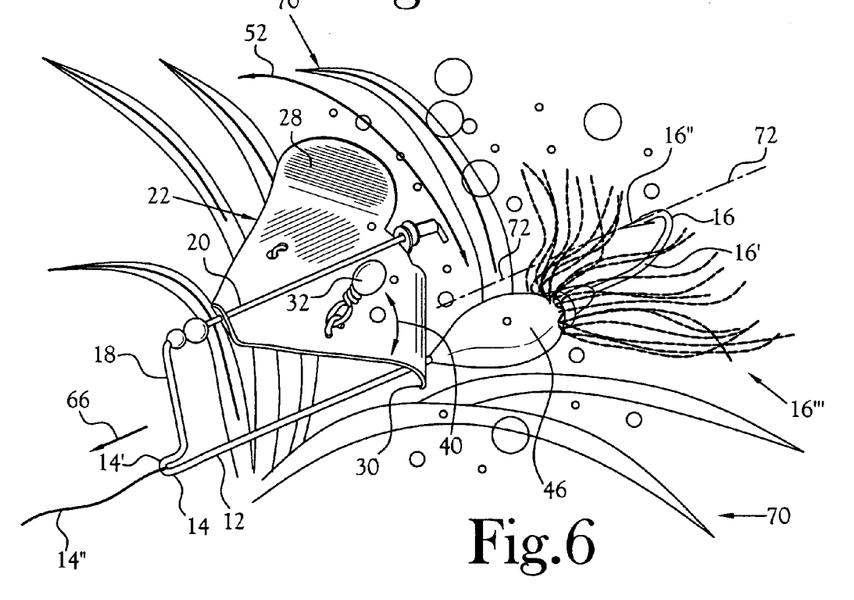
FIG. 6 is a side perspective view of the fishing lure of the present invention during trolling through water with the vegetation parted by the rotatable blade for minimizing snagging of the bait segment and fish hook.

One embodiment of a fishing lure 10 is illustrated in FIG. 1 in a stationary embodiment, and is illustrated in FIGS. 5 and 6 during use proximal of a water surface 54 of a body of water. The fishing lure 10 includes a primary wire leg 12 having a bait segment 42 affixed thereon. The bait segment 42 includes a trailing end having a fish hook 16 extended distally therefrom. The fishing lure 10 also includes a secondary wire leg 20 positioned adjacent to the primary wire leg 12. The secondary wire leg 20 supports a rotatable blade 22 for generation of sound during trolling. The wire legs 12, 20 are composed of stiff but bendable wires that are bent in a parallel alignment for positioning the bait head 42 adjacent to, and offset behind, the rotatable blade 22. The wire legs 12, 20 are joined at respective first, leading ends 12', 20' by a wire segment 18 of a selected length 18' to maintain the wire legs 12, 20 apart during trolling to allow the blade 22 to freely rotate 52 without contacting the bait head 42 (see FIGS. 2B, 5 and 6).

The bait head 42 is positioned on the primary wire leg 12 and is maintained apart from the blade 22 by the selected width 18' of about one inch to about one and a half inches apart from the rotational axis 20''' of the blade 22. The selected distance 18' between wire legs 12, 20 is maintained as the selected width of separation due to each wire leg being composed of a wire material that is generally rigid in the length dimension but is minimally bendable laterally, thereby allowing deflection of each wire leg 12, 20 and respective blade 22 and bait head 42 off and away from potential snags and obstructions in the water during trolling. The primary wire leg 12 is extended distally from an angled junction 14 having at least one generally rigid loop 14' to which a fishing line 14" is readily attachable. The primary wire leg extends a first wire length to a distal end 12" from which a fish hook shaft 16' extends to a curved barb end 16" (see FIGS. 1 and 4). The secondary wire leg 20 is extended distally from the wire segment 18 for a second wire length of about two inches to about two and a half inches. The primary wire leg 12 has a first wire length of about four inches to about five inches. During rapid trolling, the selected distance 18' can partially diminish in width separation between the wire legs 12, 20 due to minimal bending laterally of each wire leg.

Figure 4:
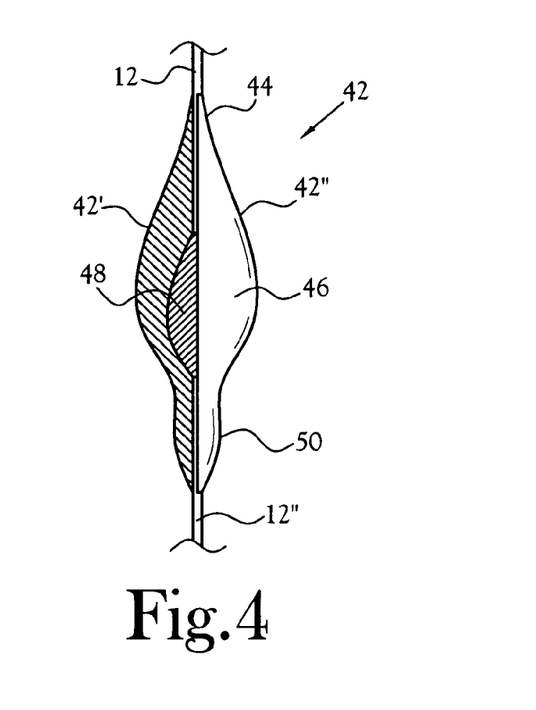
FIG. 4 is a section view along the axis of the bait segment of FIG. 1, illustrating a weight disposed within the bait segment.

The bait head 42 is disposed on the primary wire leg 12 and includes an elongated shape having an inner arcuate side 42' and an outer arcuate side 42" extending from a narrow leading end 44 (see FIG. 4). The bait head 42 expands to an enlarged mid-portion 46, and tapers to a narrow distal or trailing end 50 proximal of the distal end 12" of the primary wire leg 12. The enlarged mid-portion 46, as viewed in cross-section from the front (see FIG. 5), includes a width 46' that is not equal to a depth 46" due to the inner arcuate side 42' having a flattened or lesser curved shape in comparison with the outer arcuate side 42" having an outwardly curved shape. The asymmetric shape of the sides of the mid-portion 46 induces lift and rising motion to the water surface by the bait head 42 due to water moving across opposed unequal surface areas of arcuate sides 42', 42", and due to water forced against the lesser curved arcuate side 42' by oscillating of the blade trailing end 38 having two end opposed curved segments 28, 30 rotating 52 proximally adjacent to and forwardly of the lesser curved arcuate side 42' (see FIG. 6), when the bait head 42 and each wire leg 12, 20 are pulled during trolling 66 through water or when tugged to set the hook in a fish. The leading end 44 includes an initial width of about ⅛ inch to about ¼ inch, and an initial depth of about ¼ inch. When viewed from the front, the enlarged mid-portion 46 includes a substantially oval cross-section having a lesser curved arcuate side 42' (see FIG. 5), with the outer and inner arcuate sides being separated by a width 46' of about ⅜ inch to about ½ inch. The mid-portion 46 includes a depth 46" of about ¾ inch. One skilled in the art will recognize that alternate shapes for the front and rear tapered portions of the bait head 42, and alternate width and depth dimensions of the bait head 42 can be provided without departing from the spirit and scope of the present invention.

As illustrated in FIG. 5, the oval cross-section of the enlarged mid-portion 46 preferably disposes the inner arcuate side 42' oriented towards the rotatable blade 22. The hook barbed end 16" is curved laterally inward toward the inner arcuate side 42' of the bait head 42, and is curved forwardly toward the second end 20" of the secondary wire leg 20. The hook barbed end 16" is generally positioned to be proximally aligned 72 behind the blade axis of rotation 20'". The outer arcuate side 42" and the oval cross-section of the bait head mid-portion 46, plus the rotatable blade 22 positioned forward of the barbed end 16", will assist in deflecting obstructions from snagging the hook barbed end 16" during trolling. Therefore, the shape of the bait head 42 and the positioning of the hook barbed end 16" provides a built-in weed deflector configuration without having to attach a wire weed guard proximal of the hook barbed end 16". In one embodiment of the bait head 42, the hook shaft 16' and the hook barbed end 16" can be surrounded by a skirt 16'" of flexible filaments attached to the head portion distal end 12" in order to conceal from view the hook barbed end 16" during trolling by the skirt 16'" of flexible filaments trailing behind the bait head 42. In the embodiment illustrated in FIG. 4, the bait head 42 is composed of a generally firm material composed of a plastic, an epoxy resin, a polymer, or a ceramic material, and includes a weight 48 imbedded within. The outer surface of the bait head 42 can be coated with a pliable material such as plastic or rubber, and is marked and colored in numerous configurations to resemble a fish head with eyes oriented proximal of the tapered leading end 44. One skilled in the art will recognize that the bait segment can include additional weights removably positionable on the forward end 44, or distal end 50 of the bait head 42, in addition to the weight 48 imbedded therein, in order to influence the depth of trolling of the bait head 42.

The configuration of the blade 22 and the associated components attached thereto is illustrated in FIGS. 2A, 2B, 3 and 4. The shape of the blade 22 includes a generally triangular configuration having a narrow first end junction 24 and a broad base or trailing end 38. Each end junction 24, 38 includes an angled junction having respective holes 24', 38' therein for extension therethrough of the secondary wire leg 20. Spacers such as beads 26, 26' are positioned between the leading end 20' of the secondary wire leg and the first end junction 24, to facilitate blade rotation 52. In addition, rotational spacer 38" is positioned between the second end 20" of the secondary wire leg and the second end junction 38 to facilitate blade rotation 52. The blade 22 is readily rotated about an axis of rotation 20'" that is co-axially aligned with the secondary wire leg 20. The blade 22 includes a front surface having first and second front sections 22', 22" bisected by the secondary wire leg 20 and the axis of rotation 20'". An opposed back surface includes a first back section 22'" opposed from the front surface section 22', and a second back surface 22"" opposed from the front surface section 22". Each surface section has a pair of holes 36, 36' therein, with each pair disposed about mid-distance between the respective first and second angled side edges of the blade 22 and the axis of rotation 20'". The blade trailing end 38 is bent into two end curved surfaces angled in opposed directions on opposed sides of the axis of rotation 20'". A first angled segment 28 forms a curved extension of the second front section 22'. A second angled segment 30 forms a curved extension of the second back surface 22"", and is curved in an opposed direction from the first angled segment 28. The blade 22 is readily rotated about the axis of rotation 20'" when water is moved past each opposed curved surface of first angled segment 28 and second angled segment 30 during trolling. During passage 66 near the water surface 54, the rotating blade 22 will repetitively expose front sections 22', 22" and first angled segment 28 to the air/water surface 54 (see FIG. 5), and will repetitively expose back sections 22'", 22"" and second angled segment 30 to the air/water surface 54, with resulting creation of water turbulence and sound as the opposed blade surfaces 22', 22" and 22'", 22"" are exposed to and contact the water surface 54.

In order to improve attraction of fish for striking the bait head 42, an increase in water turbulence and sound 60 is generated by the rotating blade 22 having a sound generator pivotably attached to at least one blade surface. One embodiment for the sound generator includes a first clapper 32 and a second clapper 32' pivotably attached to diametrically opposed blade surfaces as illustrated in FIGS. 1, 2B, 3 and 5. The first clapper 32 includes a base end having a wire loop that is pivotably connected to an attachment wire 34 threaded through a pair of holes 36 in a mid-portion of the first half 22" of the blade first surface. The second clapper 32' is connected in a similar manner, with a base end having a wire loop that is pivotably connected to an attachment wire 34' threaded through a pair of holes 36' in a mid-portion of the first back section 22'" of the blade second surface. In one embodiment, each respective clapper 32, 32' is diametrically opposed and is independently pivotable and extended from opposed surfaces 22", 22'" to allow the blade 22 to rotate 52 in a balanced manner during movement 66 under water and during movement and exposure of the blade surfaces at the water surface 54.

As illustrated in FIGS. 1, 2B, 5 and 6, each respective clapper 32, 32' is pivotable in at least two directions, including laterally 40 relative to the blade axis of rotation 20'", longitudinally 56, and outwardly 58 from each opposed surface 22", 22'". As illustrated in FIG. 5, during blade rotation 52 proximal of the water surface 54, each respective opposed blade surface 22", 22'" is intermittently exposed at the water surface, and each pivotable clapper 32, 32' is pivoted 58 above the water surface 54 with generation of water droplets 64, sounds 60, and surface water turbulence as each clapper 32, 32' contacts each respective opposed blade surface 22", 22'". As each clapper 32, 32' and opposed blade surface 22", 22'" is rotated under the water surface 54, a bubble trail 62 is generated with increased underwater turbulence and associated sounds transmitted underwater, thereby attracting fish to investigate the sounds 60 and to strike the fish hook 16 extending from the distal end of the bait head 42.

One skilled in the art will recognize that the fishing lure 10 of the present invention is utilized for trolling proximal of the water surface 54 (see FIG. 5), or is utilized for deep water trolling (see FIG. 6). In one alternative, the sound generator can include one clapper pivotally attached on one blade surface, or two clappers pivotably attached on one blade surface at about a mid-portion of the blade surface. In an alternative embodiment, three or four clappers can be attached on each of the surfaces 22', 22", 22''', 22'''' of the front and back blade surfaces, thereby increasing water turbulence and generation of sounds 60 when trolling proximal of the water surface. During blade rotation 52, each of the clappers will generate at least one bubble trail 62 during trolling proximal of the water surface 54.

From the foregoing description, it will be recognized by those skilled in the art that a unique fishing lure 10 is provided that generates rotational movement 52 of a blade 22 for creation of water turbulence and generates sound utilizing opposed pivotably connected clappers 32, 32' during trolling for attraction of fish and increased strikes on a bait segment 42 of the fishing lure 10 without additional lure attachments such as weed guards. Further, the pivotably connected clappers 32, 32' are disposed in diametrically opposed relationship on the rotatable blade 22, which is maintained a spaced-apart distance 18' apart from the bait segment 42 and the barbed hook end 16" to effectively negate entanglement of the clappers 32, 32' and rotatable blade 22 with the bait segment 42 during trolling underwater or trolling at the water surface 54.

While the present invention has been illustrated by description of several embodiments and while the illustrated embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, I claim:

1. A fishing lure providing movement and sound during trolling, comprising:
    a primary wire leg having a forward segment configured for attachment to a fishing line, and having a bait segment disposed distal of said forward segment, said bait segment having a body extending to a trailing end from which a fish hook extends;
    a secondary wire leg having a leading segment extended laterally from said forward segment of said primary wire leg, said secondary wire leg having a length disposed a selected distance apart from said primary wire leg;
    a blade rotatably mounted on said secondary wire leg, said blade includes opposed surfaces having first and second end segments angled in opposed directions to facilitate rotation of said blade during trolling; and
    at least two clappers pivotably attached in diametrically opposed positions on said opposed surfaces of said blade, each clapper pivots independently on said opposed surfaces to provide balanced movement during rotation of said blade;
    whereby during trolling proximal of a water surface, each rotation of said blade positions said opposed blade surfaces for contacting the water surface with pivoting of each clapper against respective blade surfaces and further contacting of said clappers with the water surface resulting in creation of water turbulence and sound for attracting fish to strike said fish hook extended from said bait segment.

2. The fishing lure of claim 1 wherein said bait segment is disposed on said primary wire leg such that said bait segment is a sufficient distance apart from said blade such that said bait segment is adjacent and distal of said blade first and second end segments respectively during rotation of said blade thereby negating contact with said pivotable clappers and said blade end segments during blade rotation, said bait segment body includes a tapered head and an enlarged mid-portion having an oval cross-section tapering to said trailing end.

3. The fishing lure of claim 2 wherein said bait segment further includes said fish hook having a barbed end extended forwardly toward said bait segment, and a skirt of flexible filaments attached to said bait segment trailing end whereby said fish hook and barbed end are concealed from view during trolling by said skirt of flexible filaments trailing behind said bait segment.

4. The fishing lure of claim 3 wherein said bait segment includes an outer surface of said tapered head having markings thereon to resemble a fish head, said bait segment further includes a weight imbedded therein.

5. A fishing lure providing movement and sound during trolling, comprising:
    a primary wire leg having a forward segment configured for attachment to a fishing line, and having a bait segment disposed distal of said forward segment, said bait segment having a body extending to a trailing end from which a fish hook extends;
    a secondary wire leg having a leading segment extended from said forward segment of said primary wire leg, said secondary wire leg having a length disposed parallel to and a selected distance apart from said primary wire leg;
    a blade rotatably mounted on said length of said secondary wire leg, said blade having an axis of rotation aligned with said length of said secondary wire leg, said blade includes opposed surfaces having planar mid-portions extending to first and second end segments angled in opposed directions on opposed sides of said axis of rotation to facilitate balanced rotation of said blade during trolling; and
    a clapper pivotably attached on each one of said opposed surfaces having said planar mid-portions of said blade, each clapper readily moved in balanced orientation on each said opposed surface and pivots freely during rotation of said blade;
    whereby during trolling proximal of a water surface, each rotation of said blade positions said opposed blade surfaces for contacting the water surface with pivoting of each clapper against respective blade surfaces and further contacting of each clapper with the water surface resulting in creation of water turbulence and sound for attracting fish to strike said fish hook extended from said bait segment.

6. The fishing lure of claim 5 wherein said bait segment is disposed on said primary wire leg such that said bait segment is a sufficient distance apart from said blade such that said bait segment is adjacent and distal of said blade first and second end segments during rotation of said blade thereby negating contact with said pivotable clappers and said blade end segments during blade rotation, said bait segment body includes a tapered head and an enlarged mid-portion having an oval cross-section tapering to said trailing end, said oval cross-section of said enlarged mid-portion having an asymmetric shape with one lesser curved side disposed inwardly toward said secondary wire leg on which said blade is rotatably mounted, whereby said asymmetric shape induces lift upon water movement along said enlarged mid-portion resulting in said bait segment rising to the water surface.

7. A fishing lure providing movement and sound during trolling, comprising:

a primary wire leg having a forward segment configured for attachment to a fishing line, and having a bait segment disposed distal of said forward segment, said bait segment having an asymmetric arcuately shaped body extending to a trailing end from which a fish hook extends;

a secondary wire leg having a leading segment extended laterally from said forward segment of said primary wire leg, said secondary wire leg having a length disposed a selected distance apart from said primary wire leg;

a blade rotatably mounted to said secondary wire leg, said blade having an axis of rotation aligned with said secondary wire leg, said blade includes opposed blade surfaces extending to a trailing end having first and second angled segments curved in opposed directions from said blade surfaces and extending from opposed sides of said blade axis of rotation, whereby water movement along said opposed first and second angled segments facilitate rotation of said blade during trolling;

a sound generator pivotably attached on at least one of said opposed surfaces of said blade, whereby said sound generator pivots freely during rotation of said blade;

whereby upon rapid trolling proximal of a water surface, said blade is rotated by water movement across said opposed first and second angled segments and said bait segment and fish hook are maintained proximal the water surface by said leading segment connecting said primary and secondary wire legs thereby each rotation of said blade exposes said opposed blade surfaces and said sound generator to contact the water surface with resulting creation of water turbulence and sound for attracting fish to strike said fish hook.

8. The fishing lure of claim 7 further comprising:

a wire segment forming said leading segment of said secondary wire leg, said wire segment extends laterally from said forward segment of said primary and wire leg, said wire segment maintains said primary and secondary wire legs apart by said selected distance during trolling;

said rotatable blade including:

first and second blade surfaces bisected by said axis of rotation of said blade, said first angled segment is extended from said blade trailing end of said first blade surface toward said second blade surface, said second angled segment is extended from said blade trailing end of said second blade surface toward said first blade surface;

said sound generator including:

a first clapper pivotally connected on said first blade surface aside from said blade axis of rotation, said first clapper being positioned forwardly of said blade trailing end, thereby said first clapper is unhindered in pivoting motion by said first angled segment during blade rotation; and said second blade surface having a second clapper pivotably connected on a diametrically opposed side of said blade axis of rotation, said second clapper being positioned forwardly of said blade trailing end, thereby said second clapper is unhindered in pivoting motion by said second angled segment during blade rotation;

whereby upon trolling proximal of the water surface, said first and second surfaces of said blade are repetitively exposed at the water surface with each respective first and second clapper pivoting above the water surface during each blade rotation thereby resulting in creation of water turbulence and sound for attracting fish to strike said fish hook extended from said bait segment.

9. The fishing lure of claim 8 wherein said rotatable blade is disposed proximal and adjacent to said leading end of said second wire leg, said primary wire leg is extended generally parallel to said secondary wire leg, and said bait segment is disposed proximal to of said distal end of said primary wire leg, whereby said bait segment and said fish hook are disposed a sufficient distance apart from said rotatable blade such that said bait segment is adjacent and distal of said first and second angled segments during rotation of said rotatable blade thereby negating contact between said bait segment and fish hook during trolling.

10. The fishing lure of claim 9 wherein said bait segment includes:

an elongated head portion having a leading end expanding to an enlarged mid-portion having an oval cross-section, said mid-portion tapers to a distal end from which said fish hook extends, said fish hook having a barbed end curved forward toward said elongated head portion;

said mid-portion including an inner arcuate side oriented toward said rotatable blade and an outer arcuate side oriented opposite said inner arcuate side, said inner and outer arcuate sides are asymmetric in curvature with said inner arcuate side being less curved thereby inducing lift upon water movement along said bait segment; and said fish hook barbed end is curved forward toward said inner arcuate side of said elongated head portion thereby said fish hook barbed end is positioned behind said secondary wire leg having said blade rotatably disposed thereon;

whereby obstructions in the water are deflected from said fish hook barbed end due to contact with said outer arcuate side and said oval cross-section of said elongated head portion.

11. The fishing lure of claim 10 wherein said fish hook and barbed end are surrounded by a skirt of flexible filaments attached to said bait segment trailing end whereby said fish hook and barbed end are concealed from view during trolling by said skirt of flexible filaments trailing behind said bait segment.

12. The fishing lure of claim 11 wherein said bait segment includes an outer surface of said tapered head having markings thereon to resemble a fish head, said bait segment further includes a weight imbedded therein.

13. A fishing lure providing movement and sound during trolling, comprising:

a primary wire leg having a forward segment configured for attachment to a fishing line, and having a bait segment disposed distal of said forward segment, said bait segment having a body extending to a trailing end from which a fish hook extends;

a secondary wire leg having a leading segment extended laterally from said forward segment of said primary wire leg, said secondary wire leg having a length disposed a selected distance apart from said primary wire leg;

a blade is pivotably affixed at opposed forward and trailing ends to said secondary wire leg, said blade being readily rotated about an axis of rotation co-axially aligned with said secondary wire leg, said blade trailing end is configured to include first and second angled segments curved in opposed directions from said blade axis of rotation thereby said opposed first and second angled segments facilitate blade rotation during trolling, said blade including at least two sound generators pivotably disposed on diametrically opposed planar half-portion surfaces of said blade;

a bait segment is affixed on said primary wire leg such that said bait segment is a sufficient distance apart from said blade such that said blade segment is adjacent and distal of said blade first and second end segments during rotation of said blade thereby negating contact, said bait segment includes an elongated head portion having a narrow leading end expanding to an enlarged mid-portion to form an asymmetrically shaped oval cross-section, said mid-portion tapers in depth and width to said trailing end from which said fish hook extends; and whereby upon trolling proximal of a water surface, said blade is rotated by water movement across said opposed first and second angled segments, said bait segment is directed toward the water surface by water movement along said asymmetrically shaped enlarged mid-portion of said head portion thereby exposing said rotating blade for intermittently exiting the water surface with resulting creation of water turbulence and sound by said sound generators for attraction of fish to said bait segment.

14. The fishing lure of claim 13 wherein said sound generators including:

a first clapper connected to pivotably extend from at least one hole through a first surface of said blade; and a second clapper connected to pivotably extend from at least one hole through a second surface of said blade, each clapper is pivotable against respective diametrically opposed half-portions of said first surface and said second surface of said blade during rotation.

15. The fishing lure of claim 14 wherein said rotatable blade further including:

said first surface of said blade being bisected by said axis of rotation, said first surface having a first half extending to said blade trailing end from which said first angled segment is extended at a flared angle toward an opposed surface of said first surface;

said second surface forming said opposed surface of said first surface, said second surface having a second half diametrically opposed from said first half of said first surface, said second half extending to said blade trailing end from which said second angled segment is extended at a flared angle toward said first surface;

each first half and diametrically opposed second half having mid-portions with each having a pair of closely-spaced paired holes therein;

said first clapper is connected to pivotably extend from said pair of closely spaced holes through said first half of said first surface; and said second clapper is connected to pivotably extend from said pair of closely spaced holes through said second half of said second surface, each clapper is pivotable against said respective half-portions of said first half diametrically opposed from said second half of said blade during rotation;

whereby upon trolling proximal of the water surface, said first and second surfaces of said blade are repetitively exposed at the water surface with each respective first and second clapper pivotable above the water surface resulting in creation of water turbulence and sound for attracting fish to said bait segment.

16. The fishing lure of claim 15 wherein said bait segment further including outer and inner arcuate sides extending from said narrow leading end expanding to said enlarged mid-portion, said outer and inner arcuate sides are separated by said width being less than said depth, said inner arcuate side is oriented towards said rotatable blade, said inner arcuate side being less curved respective to said outer arcuate side, whereby said asymmetrically shaped oval cross-section induces lift toward the water surface during trolling of said bait segment; and a barbed end of said fish hook being curved laterally and forwardly toward said inner arcuate side of said head portion thereby said fish hook barbed end is positioned behind and adjacent said blade axis of rotation;

whereby during trolling, obstructions in the water are deflected away from said fish hook barbed end due to said inner and outer arcuate sides and said oval cross-section of said head portion.

17. The fishing lure of claim 16 wherein said fish hook and barbed end are surrounded by a skirt of flexible filaments attached to said head portion trailing end whereby said hook shaft and barbed end are concealed from view during trolling by said skirt of flexible filaments trailing behind said head portion.

* * * * *